(12) United States Patent
Taguchi

(10) Patent No.: US 10,677,288 B2
(45) Date of Patent: Jun. 9, 2020

(54) BEARING DEVICE

(71) Applicant: HONDA MOTOR CO., LTD., Tokyo (JP)

(72) Inventor: Shu Taguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/262,365

(22) Filed: Jan. 30, 2019

(65) Prior Publication Data

US 2019/0234459 A1     Aug. 1, 2019

(30) Foreign Application Priority Data

Feb. 1, 2018   (JP) .................................. 2018-16783

(51) Int. Cl.
*F16C 27/04* (2006.01)
*F16C 19/06* (2006.01)
*F16C 33/66* (2006.01)
*F04D 29/056* (2006.01)

(52) U.S. Cl.
CPC .......... *F16C 27/045* (2013.01); *F04D 29/056* (2013.01); *F16C 19/06* (2013.01); *F16C 33/664* (2013.01); *F16C 33/6659* (2013.01); *F16C 2360/23* (2013.01)

(58) Field of Classification Search
CPC ........ F16C 19/06; F16C 19/26; F16C 27/045; F16C 33/664; F16C 33/56659; F16C 2326/23; F16C 33/6659; F16C 2360/23; Y10T 464/50; F04D 29/056

USPC ........ 384/99, 114, 119, 462, 490, 535, 103, 384/517
See application file for complete search history.

(56) References Cited

U.S. PATENT DOCUMENTS

| | | | | |
|---|---|---|---|---|
| 3,910,651 A | * | 10/1975 | Pearce | F01D 21/045 384/99 |
| 5,080,499 A | * | 1/1992 | Klusman | F16C 27/045 384/99 |
| 8,727,699 B2 | * | 5/2014 | Vetters | F01D 25/164 415/109 |
| 2002/0076124 A1 | * | 6/2002 | Bos | F01D 25/164 384/99 |

(Continued)

FOREIGN PATENT DOCUMENTS

| JP | 08-261231 | 10/1996 | | |
|---|---|---|---|---|
| JP | 2008121889 A | * | 5/2008 | F04D 19/042 |

*Primary Examiner* — Marcus Charles
(74) *Attorney, Agent, or Firm* — Rankin, Hill & Clark LLP

(57) ABSTRACT

In a bearing device, a squeeze film damper includes an annular mass member disposed in a floating state between an outer periphery of an outer race and an inner periphery of a bearing retaining member, a first squeeze film damper part formed between the outer periphery of the outer race and an inner periphery of the annular mass member, and a second squeeze film damper part formed between an outer periphery of the annular mass member and the inner periphery of the bearing retaining member. Therefore, due to the floatingly supported annular mass member being eccentric with the opposite phase to a rotating shaft, which is eccentric and undergoes centrifugal whirling, an inertial force acting on the annular mass member counteracts the centrifugal force acting on the rotating shaft, thus enabling a damping effect to be exhibited.

1 Claim, 5 Drawing Sheets

(56) References Cited

U.S. PATENT DOCUMENTS

| | | | |
|---|---|---|---|
| 2007/0086685 A1* | 4/2007 | Klusman | F01D 25/125 |
| | | | 384/99 |
| 2014/0086731 A1* | 3/2014 | Schmidt | F01D 25/125 |
| | | | 415/170.1 |
| 2015/0078696 A1* | 3/2015 | Schmidt | F01D 25/125 |
| | | | 384/504 |
| 2017/0058909 A1* | 3/2017 | Barber | F04D 29/059 |
| 2017/0227055 A1* | 8/2017 | Manabe | F04D 29/668 |

* cited by examiner

BEARING DEVICE

CROSS REFERENCE TO RELATED APPLICATIONS

The present application claims priority under 35 U.S.C. § 119 to Japanese Patent Application No. 2018-16783 filed Feb. 1, 2018 the entire contents of which are hereby incorporated by reference.

BACKGROUND OF THE INVENTION

Field of the Invention

The present invention relates to a bearing device comprising an inner race fitted around an outer periphery of a rotating shaft, an outer race supported on an inner periphery of a bearing retaining member via a squeeze film damper, and a plurality of rolling bodies disposed between the inner race and the outer race.

Description of the Related Art

A bearing device equipped with such a squeeze film damper has a restriction on the oil film thickness of a squeeze film that can give an effective vibration attenuation effect, and when a rotating shaft moves in the radial direction in response to the input of a large vibration load and the oil film thickness of the squeeze film becomes too small, there is the problem that the oil film becomes rigid and an effective vibration attenuation effect cannot be obtained. In order to prevent the oil film from becoming rigid, if the oil film thickness of the squeeze film is set to be large in advance, there is the problem that not only is it not possible to obtain an effective vibration attenuation effect, but also the rotating shaft easily undergoes centrifugal whirling due to vibration.

An arrangement in which a pair of annular concentric springs are disposed between a bearing metal and a bearing casing, and the concentric springs keep the oil film thickness of a squeeze film formed between the bearing metal and the bearing casing constant, thereby preventing the oil film thickness of the squeeze film from becoming excessively small, is known from Japanese Patent Application Laid-open No. 8-261231.

However, in the conventional arrangement above, when a large vibration load is inputted, a force due to strong centrifugal whirling of a rotating shaft is transmitted to the casing via the concentric spring or the rigid oil film, and there are problems relating to a bearing retaining member or the casing being broken.

SUMMARY OF THE INVENTION

The present invention has been accomplished in light of the above circumstances, and it is an object thereof to enhance the damping effect of a bearing device equipped with a squeeze film damper.

In order to achieve the object, according to a first aspect of the present invention, there is provided a bearing device comprising an inner race fitted around an outer periphery of a rotating shaft, an outer race supported on an inner periphery of a bearing retaining member via a squeeze film damper, and a plurality of rolling bodies disposed between the inner race and the outer race, the squeeze film damper comprising an annular mass member disposed in a floating state between an outer periphery of the outer race and the inner periphery of the bearing retaining member, a first squeeze film damper part formed between the outer periphery of the outer race and an inner periphery of the annular mass member, and a second squeeze film damper part formed between an outer periphery of the annular mass member and the inner periphery of the bearing retaining member.

In accordance with the first aspect, since the bearing device includes the inner race fitted around the outer periphery of the rotating shaft, the outer race supported on the inner periphery of the bearing retaining member via the squeeze film damper, and the plurality of rolling bodies disposed between the inner race and the outer race, the vibration generated by the rotating shaft undergoing centrifugal whirling due to imbalance of the weight is damped by the squeeze film damper during the process of being transmitted from the outer race of the bearing device to the bearing retaining member.

Since the squeeze film damper of the bearing device includes the annular mass member disposed in a floating state between the outer periphery of the outer race and the inner periphery of the bearing retaining member, the first squeeze film damper part formed between the outer periphery of the outer race and the inner periphery of the annular mass member, and the second squeeze film damper part formed between the outer periphery of the annular mass member and the inner periphery of the bearing retaining member, due to the floatingly supported annular mass member being eccentric with the opposite phase to the rotating shaft, which is eccentric and undergoes centrifugal whirling, the inertial force acting on the annular mass member counteracts the centrifugal force acting on the rotating shaft, thus enabling a damping effect to be exhibited.

As a result, a higher damping effect can be obtained by damping the vibration generated by the centrifugal whirling of the rotating shaft not only with the first squeeze film damper part and the second squeeze film damper part but also with the annular mass member, which rotates eccentrically.

According to a second aspect of the present invention, in addition to the first aspect, a center of gravity of the annular mass member is eccentric to a center of the annular mass member.

In accordance with the second aspect, since the center of gravity of the annular mass member is eccentric to the center thereof, it is possible to generate an inertial force required for damping by increasing the amount of eccentricity of the center of gravity of the annular mass member without increasing the mass of the annular mass member.

Note that a sleeve 41 of embodiments corresponds to the rotating shaft of the present invention, and balls 47 of the embodiments correspond to the rolling bodies of the present invention.

The above and other objects, characteristics and advantages of the present invention will be clear from detailed descriptions of the preferred embodiments which will be provided below while referring to the attached drawings.

DESCRIPTION OF THE PREFERRED EMBODIMENTS

First Embodiment

A first embodiment of the present invention is explained below by reference to FIG. 1 to FIG. 4.

Figure 1:
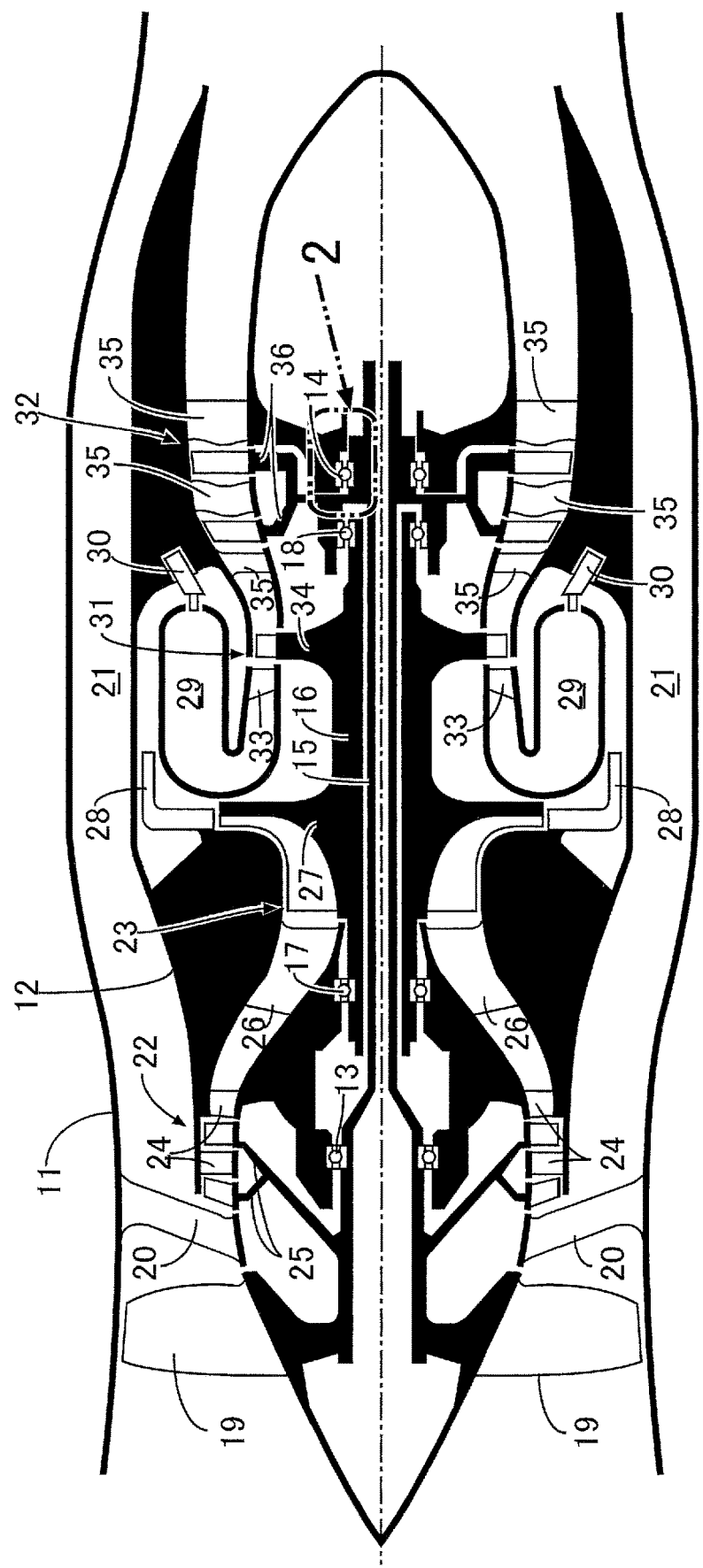
FIG. 1 is a diagram showing the overall structure of a gas turbine engine (first embodiment).

As shown in FIG. 1, a gas turbine engine for an airplane to which the present invention is applied includes an outer casing 11 and an inner casing 12, and a front part and a rear part of a low pressure system shaft 15 are rotatably supported in the interior of the inner casing 12 via a front first bearing 13 and a rear first bearing 14. A tubular high pressure system shaft 16 is relatively rotatably fitted around the outer periphery of an intermediate part in the axial direction of the low pressure system shaft 15, a front part of the high pressure system shaft 16 is rotatably supported on the inner casing 12 via a front second bearing 17, and a rear part of the high pressure system shaft 16 is relatively rotatably supported on the low pressure system shaft 15 via a rear second bearing 18.

Fixed to the front end of the low pressure system shaft 15 is a front fan 19 having its blade tip facing an inner face of the outer casing 11, and part of the air sucked in by the front fan 19 passes through a stator vane 20 disposed between the outer casing 11 and the inner casing 12; part thereof then passes through an annular bypass duct 21 formed between the outer casing 11 and the inner casing 12 and is jetted rearward, and another part is supplied to an axial low pressure compressor 22 and a centrifugal high pressure compressor 23 disposed in the interior of the inner casing 12.

The low pressure compressor 22 includes a stator vane 24 fixed to the interior of the inner casing 12 and a low pressure compressor wheel 25 equipped with a compressor blade on the outer periphery and fixed to the low pressure system shaft 15. The high pressure compressor 23 includes a stator vane 26 fixed to the interior of the inner casing 12 and a high pressure compressor wheel 27 equipped with a compressor blade on the outer periphery and fixed to the high pressure system shaft 16.

A reverse flow combustion chamber 29 is disposed to the rear of a diffuser 28 connected to the outer periphery of the high pressure compressor wheel 27, and fuel is injected into the interior of the reverse flow combustion chamber 29 from a fuel injection nozzle 30. Fuel and air are mixed and combusted in the interior of the reverse flow combustion chamber 29, and the combustion gas thus generated is supplied to a high pressure turbine 31 and a low pressure turbine 32.

The high pressure turbine 31 includes a nozzle guide vane 33 fixed to the interior of the inner casing 12, and a high pressure turbine wheel 34 equipped with a turbine blade on the outer periphery and fixed to the high pressure system shaft 16. The low pressure turbine 32 includes a nozzle guide vane 35 fixed to the interior of the inner casing 12, and a low pressure turbine wheel 36 equipped with a turbine blade on the outer periphery and fixed to the low pressure system shaft 15.

Therefore, when the high pressure system shaft 16 is driven by a starter motor, which is not illustrated, air sucked in by the high pressure compressor wheel 27 is supplied to the reverse flow combustion chamber 29, mixed with fuel, and combusted, and the combustion gas thus generated drives the high pressure turbine wheel 34 and the low pressure turbine wheel 36. As a result, the low pressure system shaft 15 and the high pressure system shaft 16 rotate, and the front fan 19, the low pressure compressor wheel 25, and the high pressure compressor wheel 27 compress air and supply it to the reverse flow combustion chamber 29, the operation of the gas turbine engine thus continuing even when the starter motor is stopped.

While the gas turbine engine is operating, part of the air sucked in by the front fan 19 passes through the bypass duct 21 and is jetted rearward, thus generating the main thrust at a time of low speed flying in particular. The rest of the air sucked in by the front fan 19 is supplied to the reverse flow combustion chamber 29, mixed with fuel, combusted to thus drive the low pressure system shaft 15 and the high pressure system shaft 16, and then jetted rearward to generate thrust.

The structure of the periphery of the rear first bearing 14 is now explained by reference to FIG. 2.

Figure 2:
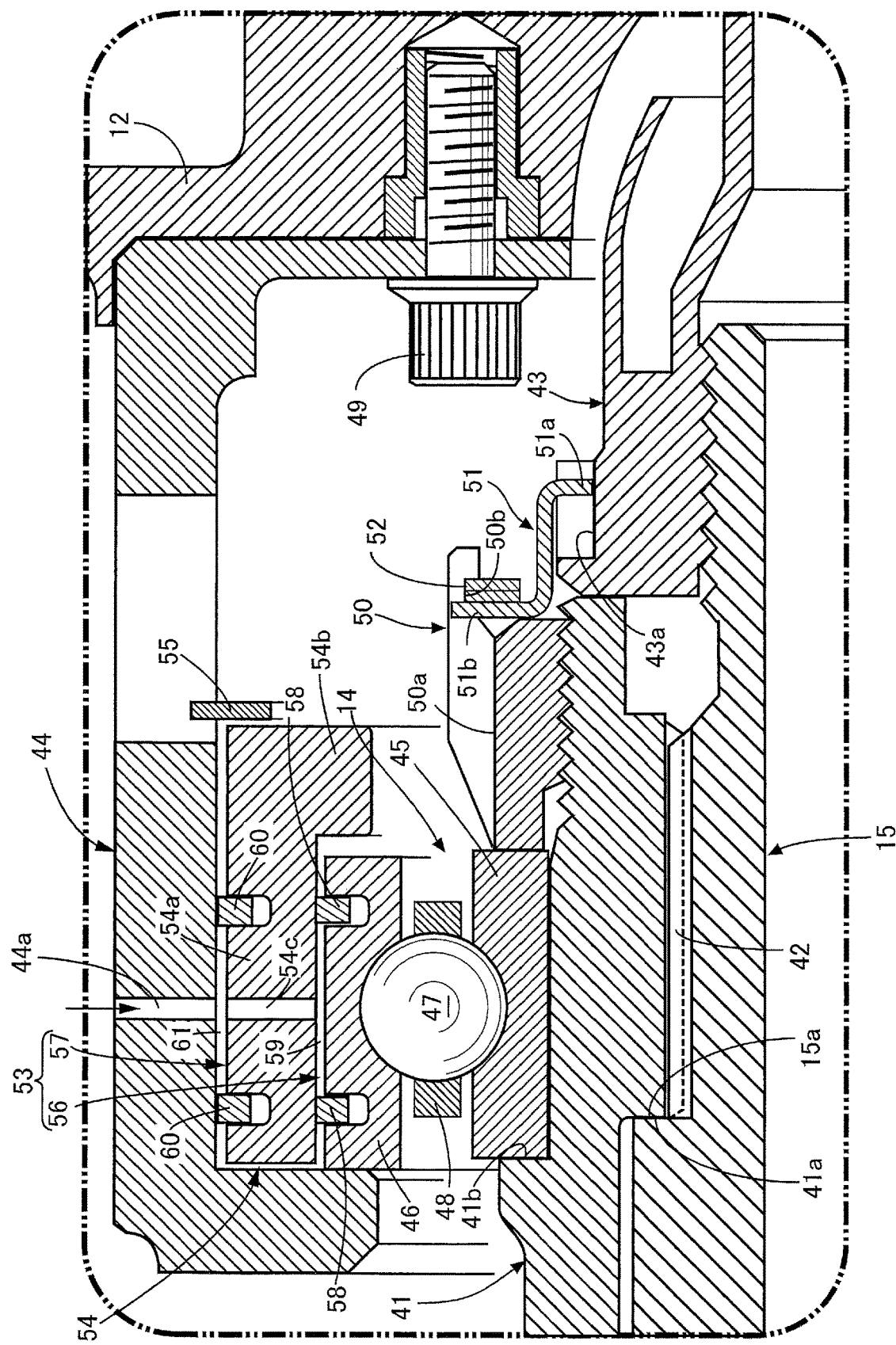
FIG. 2 is an enlarged view of part 2 in FIG. 1 (first embodiment).

A sleeve 41 for supporting the low pressure turbine wheel 36 is spline fitted around the outer periphery of the low pressure system shaft 15 by a spline fitting 42, and the sleeve 41 is fastened to the low pressure system shaft 15 by screwing a first nut member 43 around the outer periphery of a shaft end of the low pressure system shaft 15, pushing the sleeve 41 leftward in FIG. 2, and pressing a step portion 41a formed on the inner periphery of the sleeve 41 against a step portion 15a formed on the outer periphery of the low pressure system shaft 15.

The rear first bearing 14 includes an inner race 45 fitted around the outer periphery of the sleeve 41, an outer race 46 retained by the inner periphery of a bearing retaining member 44 provided on the inner casing 12, a plurality of balls 47 disposed between the inner race 45 and the outer race 46, and a retainer 48 retaining the balls 47 at equal intervals in the peripheral direction. The inner race 45 is urged leftward in FIG. 2 by means of a second nut member 50 screwed around the outer periphery of an end part of the sleeve 41 and is fastened by being pressed against a step portion 41b formed on the outer periphery of the sleeve 41. The bearing retaining member 44 is integrally fastened to the inner casing 12 by means of bolts 49.

The directions in which the first nut member 43 and the second nut member 50 are screwed are set to be opposite to each other. That is, when the first nut member 43 is a right-hand screw the second nut member 50 is a left-hand screw, and when the first nut member 43 is a left-hand screw the second nut member 50 is a right-hand screw. A plurality of first groove portions 43a opening rightward in the axial direction in FIG. 2 are formed in the outer periphery of an end part of the first nut member 43 at equal intervals in the peripheral direction, and a plurality of second groove portions 50a opening rightward in the axial direction in FIG. 2 are formed in the outer periphery of the second nut member 50 at equal intervals in the peripheral direction.

An annular linking member 51 disposed between the first nut member 43 and the second nut member 50 includes two first projection portions 51a that are disposed at intervals of 180° in the circumferential direction and can engage with the first groove portions 43a of the first nut member 43, and three second projection portions 51b that are disposed at intervals of 120° in the circumferential direction and can engage with the second groove portions 50a of the second nut member 50.

A ring spring 52 that makes the linking member 51 latch onto the second nut member 50 is formed by winding a flat resilient metal plate with substantially two rotations into a ring shape, and an outer peripheral part thereof can engage with step portions 50b formed on the inner periphery of an end part of the second nut member 50.

Since the directions in which the first nut member 43 and the second nut member 50 are screwed are opposite from each other, when the first nut member 43 rotates in a loosening direction, the rotation acts on the second nut member 50 via the linking member 51 in a direction that tightens it, and it thus prevents both the first nut member 43 and the second nut member 50 from becoming loosened. Conversely, when the second nut member 50 attempts to rotate in a loosening direction, since the rotation acts on the first nut member 43 via the linking member 51 in a direction that tightens it, both the first nut member 43 and the second nut member 50 are prevented from loosening at the same time.

A squeeze film damper 53 is provided on the rear first bearing 14, which supports the rear part of the low pressure system shaft 15 via the sleeve 41, the squeeze film damper 53 including an annular mass member 54 disposed in a floating state between the outer periphery of the outer race 46 and the inner periphery of the bearing retaining member 44. The annular mass member 54 includes an annular ring portion 54a, and a weight portion 54b formed by thickening one end part in the axial direction of the ring portion 54a so that it bulges radially inward, and is axially non-movably retained on the interior of the bearing retaining member 44 by means of a clip 55 but is freely movable in the radial direction within the range of a gap formed between the outer periphery of the outer race 46 and the inner periphery of the bearing retaining member 44.

The squeeze film damper 53 includes a first squeeze film damper part 56 on the radially inner side and a second squeeze film damper part 57 on the radially outer side. The first squeeze film damper part 56 is formed from an annular oil chamber 59 defined between the outer periphery of the outer race 46 and the inner periphery of the annular mass member 54 and sealed by a pair of seal rings 58 provided on the outer periphery of the outer race 46, and the second squeeze film damper part 57 is formed from an annular oil chamber 61 defined between the outer periphery of the annular mass member 54 and the inner periphery of the bearing retaining member 44 and sealed by a pair of seal rings 60 provided on the outer periphery of the annular mass member 54. Oil that has been sucked up by an oil pump, which is not illustrated, is supplied to the oil chamber 61 of the second squeeze film damper part 57 via an oil hole 44a extending through the bearing retaining member 44, and is supplied therefrom to the oil chamber 59 of the first squeeze film damper part 56 via an oil hole 54c extending through the annular mass member 54.

Figure 3:
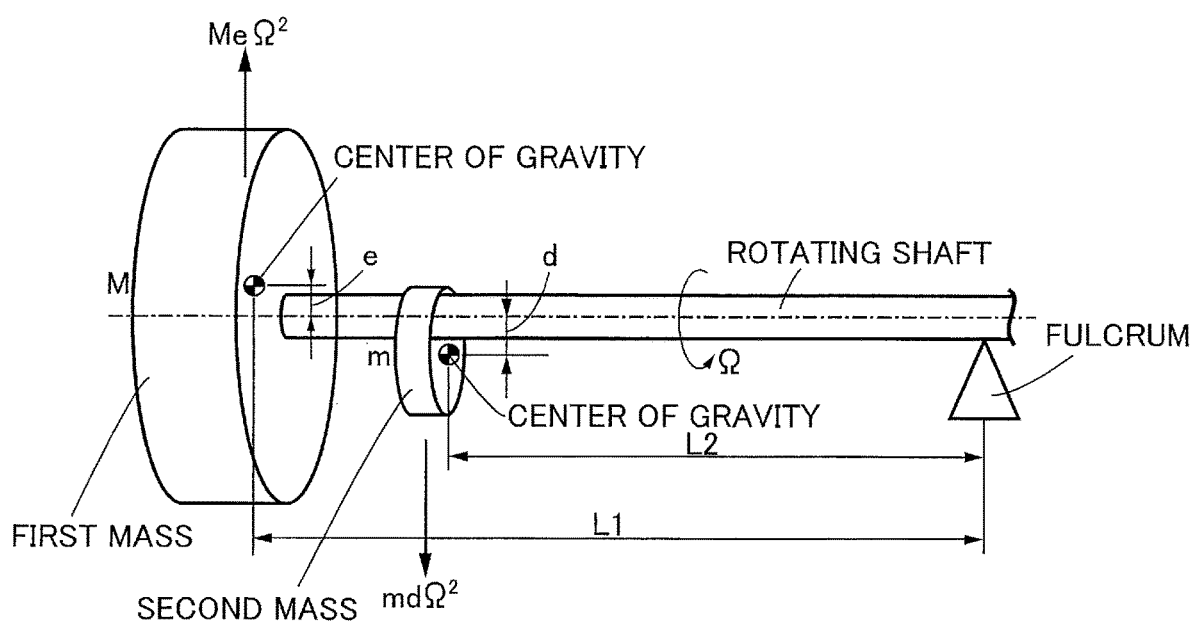
FIG. 3 is a diagram in which a bearing device of the present embodiment is modeled (first embodiment).

FIG. 3 shows a model of a rigid shaft in order to explain the effect of the annular mass member included in the bearing device of the present invention; a rotating shaft (sleeve 41) has one end supported on a stationary part (inner casing 12) and has the other end to which a first mass (front fan 19) having a mass M is fixed. An annular second mass (annular mass member 54) having a mass m is floatingly supported on the outer periphery of the rotating shaft so that it can move freely in the radial direction. The second mass, which is floatingly supported on both the rotating shaft and a support system, can be considered to be connected to the rotating shaft and the support system by means of a virtual spring that has a very small spring constant. The distance between the fulcrum and the center of gravity of the first mass is L1, and the distance between the fulcrum and the center of gravity of the second mass is L2.

When for example the front fan fixed to the rotating shaft is broken for any reason, the center of gravity of the first mass becomes eccentric to the axis of the rotating shaft only by a distance e, and the rotating shaft undergoes centrifugal whirling due to the centrifugal force, thus generating vibration. This vibration of the rotating shaft is transmitted from the rear first bearing 14 to the squeeze film damper 53, damped by means of the first squeeze film damper part 56 and the second squeeze film damper part 57, and then transmitted to the inner casing 12 via the bearing retaining member 44.

In this process, in the squeeze film damper 53 of the present embodiment a further damping effect is exhibited by the floatingly supported annular mass member 54, that is, the second mass shown in FIG. 2. The damping effect exhibited by the second mass is explained below.

Figure 4:
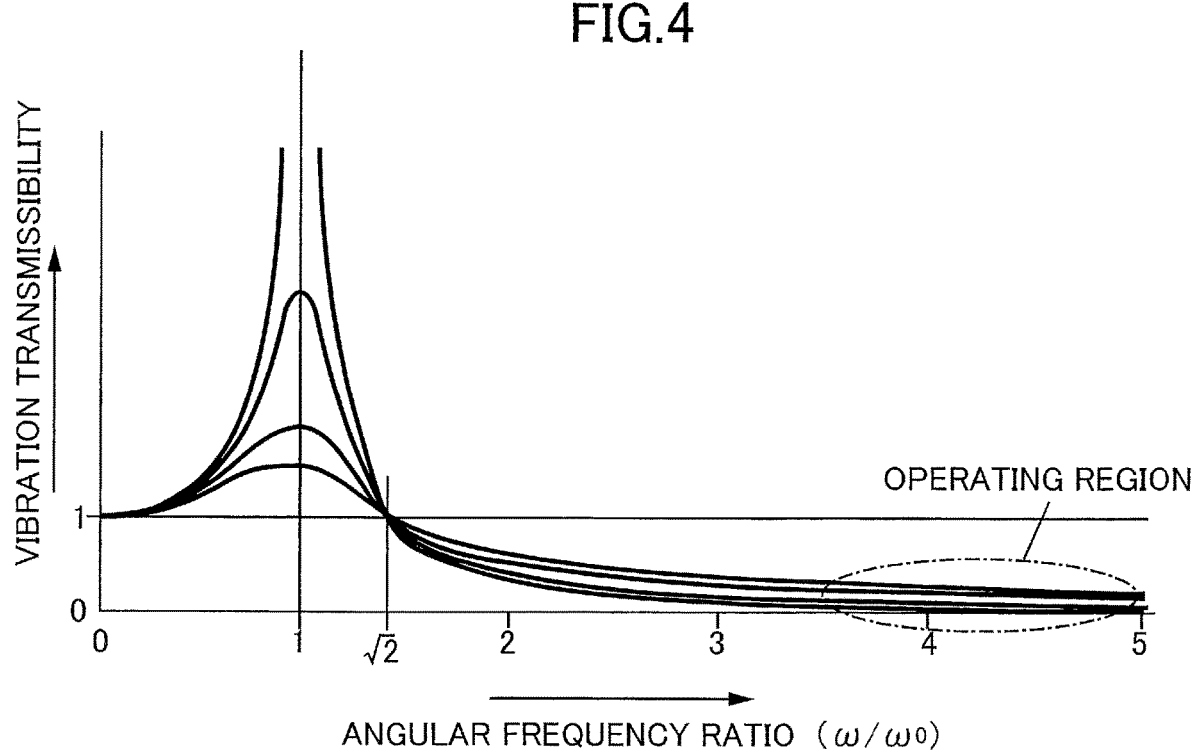
FIG. 4 is a graph showing the vibration transmissibility of an annular mass member (first embodiment).

The graph of FIG. 4 shows the vibration transmissibility of a general vibration transmission system from a rotating shaft to a support system with respect to various attenuation ratios; the vibration transmissibility as the ordinate denotes the ratio of the load transmitted to the support system among excitation forces inputted from the rotating shaft, and the angular frequency ratio as the abscissa denotes the ratio of angular frequency ω inputted from the rotating shaft with respect to characteristic angular frequency ω0 of the overall vibration system.

Although the second mass floatingly supported so that it can move in the radial direction has the predetermined mass m, since it is connected to the rotating shaft and the support system via a virtual spring having a very small spring constant, its characteristic angular frequency ω0 is a very small value. Therefore, since every type of centrifugal whirling angular frequency ω of the rotating shaft in a normal operating region of the gas turbine engine satisfies the angular frequency ratio (ω/ω0)>>1, the vibration transmissibility is less than 1. That is, the inertial force of the second mass having a phase opposite to the vibration phase of the rotating shaft counteracts the vibration of the rotating shaft, thereby preventing the vibration from being transmitted to the bearing retaining member 44 or the inner casing 12.

In the rigid shaft model of FIG. 3, with regard to the second mass, which is floatingly supported on the rotating shaft and vibrates with a phase opposite to that of the rotating shaft, the center of gravity thereof is eccentric in a direction opposite to the displacement direction of the first mass only by a distance d from the axis of the rotating shaft. In this way, when the second mass having a phase opposite to the displacement direction of the first mass undergoes centrifugal whirling at an angular velocity Ω, the centrifugal force acting on the first mass and the inertial force acting on the second mass counteract each other, and vibration of the rotating shaft is suppressed.

That is, where the centrifugal force acting on the first mass is given by $MeΩ^2$ and the inertial force acting on the second mass is given by $mdΩ^2$, if $$MeΩ^2 L1 = mdΩ^2 L2$$

holds, in other words if the mass m of the second mass, the amount of eccentricity d, and the mounting position are set so as to satisfy $$md = (L1/L2)Me,$$

then the moment of the rotating shaft is zero, thus enabling a maximum damping force to be exhibited.

In the same way as above, in the case of an elastic shaft also, the inertial force of the annular mass exhibits a damping force with a phase opposite to the vibration of the shaft; in particular, the annular mass member is put in by floatingly supporting it at a position in the axial direction where the amplitude in the elastic mode becomes a maximum, and a larger damping effect can thus be obtained.

In this way, even when imbalance occurs in the front fan 19, the sleeve 41, which is integral with the low pressure system shaft 15, undergoes centrifugal whirling, and vibration occurs, the vibration is damped by means of the inertial force of the annular mass member 54 of the squeeze film damper 53 and hardly any is transmitted to the bearing retaining member 44, thus preventing the inner casing 12 from being damaged by the vibration.

As described above, at the same time as the annular mass member 54 exhibits a damping effect, the first squeeze film damper part 56 between the outer race 46 of the rear first bearing 14 and the annular mass member 54 exhibits its intrinsic damping function, and the second squeeze film damper part 57 between the annular mass member 54 and the bearing retaining member 44 exhibits its intrinsic damping function.

That is, when oil is supplied from the oil pump, which is not illustrated, to the oil chamber 61 of the second squeeze film damper part 57 via the oil hole 44a of the bearing retaining member 44, part of the oil is further supplied to the oil chamber 59 of the first squeeze film damper part 56 via the oil hole 54c of the annular mass member 54, and a squeeze film is formed in the two oil chambers 59 and 61 from a thin film of oil. When the low pressure system shaft 15 vibrates in the radial direction during operation of the gas turbine engine, the vibration is transmitted to the outer race 46 of the rear first bearing 14, whose inner race 45 is supported on the sleeve 41 integral with the low pressure system shaft 15.

As a result, the size of a gap in the radial direction of the oil chamber 59 of the first squeeze film damper part 56 increases and decreases in response to vibration in the radial direction of the outer race 46 of the rear first bearing 14, the shaft is damped by virtue of a resistance force generated by flow and compression of viscous oil of the squeeze film within the oil chamber 59, and a reaction force thereto is received by the reaction force of the annular mass member 51. Vibration that could not be removed by the damping force of the first squeeze film damper part 56 and the inertial force of the annular mass member 54 itself is damped by the second squeeze film damper part 57 in the same way, and transmission from the bearing retaining member 44 to the inner casing 12 is thus prevented.

When the first squeeze film damper part 56 and the second squeeze film damper part 57 exhibit a damping effect, oil that has absorbed vibration energy generates heat and its temperature rises, but oil whose temperature has risen is discharged in succession from an abutment opening of the seal rings 58 of the first squeeze film damper part 56 and is also discharged in succession from an abutment opening of the seal rings 60 of the second squeeze film damper part 57, and fresh oil is supplied from the oil pump, thereby maintaining the damping function of the squeeze film damper 53.

As described above, in accordance with the present embodiment, due to the synergistic effect between the damping effect of the annular mass member 54 and the damping effect of the first and second squeeze film damper parts 56 and 57, a very high damping performance can be obtained.

Second Embodiment

Figure 5:
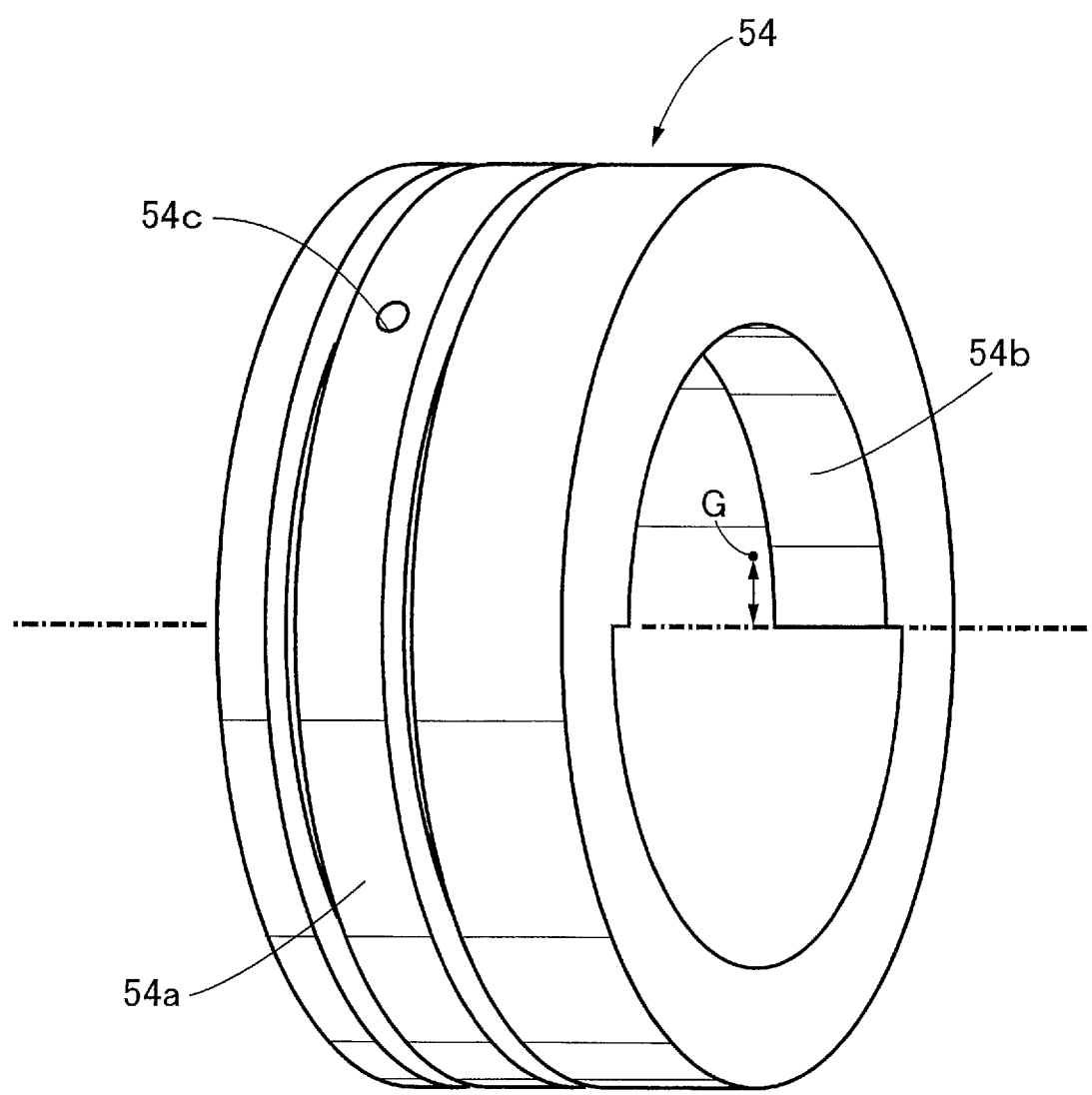
FIG. 5 is a perspective view of an annular mass member (second embodiment).

A second embodiment of the present invention is now explained by reference to FIG. 5.

The shape of the annular mass member 54 of the first embodiment is a rotating body, and the center of gravity thereof coincides with the central axis of the annular mass member 54. On the other hand, the center of gravity of an annular mass member 54 of the second embodiment deviates from the central axis in the radial direction due to part of a weight portion 54b in the peripheral direction being thick in the radial direction.

The annular mass member 54 of the second embodiment rotates eccentrically with respect to the eccentric rotation of the sleeve 41, which undergoes centrifugal whirling, in a state in which the phase of the center of gravity deviates by 180°. In this process, since the amount of eccentricity of the center of gravity of the annular mass member 54 of the second embodiment is larger than the amount of eccentricity of the center of gravity of the annular mass member 54 of the first embodiment, it is possible to generate a large inertial force for damping. Therefore, if the size of the centrifugal force necessary for damping is the same, it is possible to reduce the volume of the annular mass member 54 compared with the first embodiment, thus saving space.

Embodiments of the present invention are explained above, but the present invention may be modified in a variety of ways as long as the modifications do not depart from the gist of the present invention.

For example, the target to which the present invention is applied is not limited to the rear first bearing 14 of the gas turbine engine of the embodiments; application thereof is possible to other bearings of a gas turbine engine, and application thereof is also possible to a bearing for any purpose other than a gas turbine engine.

Furthermore, the rear first bearing 14 of the embodiments is a ball bearing, but it may be another type of bearing such as a roller bearing or a needle bearing.

What is claimed is:

1. A bearing device comprising an inner race fitted around an outer periphery of a rotating shaft, an outer race supported on an inner periphery of a bearing retaining member via a squeeze film damper, and a plurality of rolling bodies disposed between the inner race and the outer race, the squeeze film damper comprising an annular mass member disposed in a floating state between an outer periphery of the outer race and the inner periphery of the bearing retaining member, a first squeeze film damper part formed between the outer periphery of the outer race and an inner periphery of the annular mass member, and a second squeeze film damper part formed between an outer periphery of the annular mass member and the inner periphery of the bearing retaining member, wherein a center of gravity of the annular mass member is eccentric to a center of the annular mass member.

* * * * *